(12) United States Patent
Pinkse et al.

(10) Patent No.: US 12,395,360 B2
(45) Date of Patent: Aug. 19, 2025

(54) KEY HOLDER FOR AN OPTICAL KEY AND SYSTEM COMPRISING THE KEY HOLDER FOR AUTHENTICATING AN OPTICAL KEY BY VERIFYING A MATCH OF CHALLENGE-RESPONSE PAIRS

(71) Applicant: UNIVERSITEIT TWENTE, Enschede (NL)

(72) Inventors: Pepijn Pinkse, Enschede (NL); Matthijs Velsink, Amsterdam (NL)

(73) Assignee: UNIVERSITEIT TWENTE, Enschede (NL)

( * ) Notice: Subject to any disclaimer, the term of this patent is extended or adjusted under 35 U.S.C. 154(b) by 295 days.

(21) Appl. No.: 18/265,681

(22) PCT Filed: Dec. 10, 2021

(86) PCT No.: PCT/EP2021/025488
§ 371 (c)(1),
(2) Date: Jun. 7, 2023

(87) PCT Pub. No.: WO2022/122185
PCT Pub. Date: Jun. 16, 2022

(65) Prior Publication Data
US 2024/0039740 A1    Feb. 1, 2024

Related U.S. Application Data

(60) Provisional application No. 63/124,135, filed on Dec. 11, 2020.

(51) Int. Cl.
*H04L 9/32* (2006.01)
*G02B 6/38* (2006.01)

(52) U.S. Cl.
CPC .......... *H04L 9/3278* (2013.01); *G02B 6/3831* (2013.01); *G02B 6/3834* (2013.01); *G02B 6/3855* (2013.01); *H04L 2209/12* (2013.01)

(58) Field of Classification Search
CPC .......................... H04L 2209/12; H04L 9/3278
See application file for complete search history.

(56) References Cited

U.S. PATENT DOCUMENTS

| | | | |
|---|---|---|---|
| 5,666,449 A | 9/1997 | Sawae et al. | |
| 2015/0229482 A1* | 8/2015 | Pinkse | H04L 9/0852 |
| | | | 380/28 |

(Continued)

FOREIGN PATENT DOCUMENTS

| | | |
|---|---|---|
| EP | 2 693 685 B1 | 9/2017 |
| EP | 3 252 740 B1 | 8/2018 |
| WO | WO 2019/209788 A1 | 10/2019 |

OTHER PUBLICATIONS

H. U. Babu: "Reflective-Physically Unclonable Function based System for Anti-Counterfeiting", URL:https://publikationen.bibliothek.kit.edu/1000038387, pp. 1-167 (2013).

*Primary Examiner* — Gary S Gracia
(74) *Attorney, Agent, or Firm* — Norman B. Thot

(57) ABSTRACT

A key holder includes a ferrule, a multimode light guide at least partly embedded inside the ferrule, an optical key which has a light scattering material, and a mechanical mount which mounts each of the ferrule, the multimode light guide, and the optical key. The multimode light guide has a front facet and a back facet which are arranged at opposite ends. The back facet of the multimode light guide contacts the optical key. Light can enter into the multimode light guide via the front facet, propagate through the multimode light guide, be scattered by the optical key, and propagate back through the multimode light guide and exit via the front facet. The mechanical mount is detachably connected to a mechanical mount terminator. The front facet of the multimode light guide is oriented in a direction of the mechanical mount terminator.

22 Claims, 7 Drawing Sheets

(56) References Cited

U.S. PATENT DOCUMENTS

| | | | | |
|---|---|---|---|---|
| 2016/0307381 A1* | 10/2016 | Siebels | ............... | G06F 21/88 |
| 2017/0053285 A1* | 2/2017 | Kim | ............... | G06Q 20/3224 |
| 2017/0317990 A1* | 11/2017 | Kim | ............... | H04W 12/065 |
| 2018/0063709 A1* | 3/2018 | Morrison | ............ | H04W 12/069 |
| 2018/0109947 A1* | 4/2018 | Kim | ............... | H04W 12/041 |
| 2018/0227706 A1* | 8/2018 | Cho | ............... | H04W 4/023 |
| 2019/0109719 A1* | 4/2019 | Davis | ............... | H04L 9/0869 |
| 2020/0209494 A1* | 7/2020 | Watté | ............... | G02B 6/423 |
| 2020/0400890 A1* | 12/2020 | Kopinetz | ............ | G02B 6/3636 |
| 2021/0041634 A1* | 2/2021 | Jensen | ............... | G02B 6/3831 |
| 2023/0222787 A1* | 7/2023 | Bean | ............... | H04L 9/3242 |
| | | | | 382/104 |
| 2023/0308190 A1* | 9/2023 | Zhdanova | ............ | H04B 10/25 |

* cited by examiner

KEY HOLDER FOR AN OPTICAL KEY AND SYSTEM COMPRISING THE KEY HOLDER FOR AUTHENTICATING AN OPTICAL KEY BY VERIFYING A MATCH OF CHALLENGE-RESPONSE PAIRS

CROSS REFERENCE TO PRIOR APPLICATIONS

This application is a U.S. National Phase application under 35 U.S.C. § 371 of International Application No. PCT/EP2021/025488, filed on Dec. 10, 2021 and which claims benefit to U.S. Provisional Patent Application No. 63/124,135, filed on Dec. 11, 2020. The International Application was published in English on Jun. 16, 2022 as WO 2022/122185 A1 under PCT Article 21(2).

FIELD

The present invention is related to the field of Physical Unclonable Keys (PUKs), in particular to optical PUKs (optical keys). The present invention is more particularly related to a key holder comprising the optical key and to a system comprising the key holder. The system can, for example, be a system for authenticating an optical key by verifying a match of challenge-response pairs.

BACKGROUND

Secure communication and authorization are highly important topic these days. Many secure communication and authorization schemes rely on cryptographic systems and methods. In classical cryptography, the mathematically (still not entirely proven) fact is used that some mathematical functions can be calculated in one direction without any problems, but solving the inverse mathematical problem is hardly possible; at least this would require extremely high and time-consuming computational efforts. However, these computational efforts will suddenly be significantly reduced when the first full-scale quantum computers will start operation. A search therefore exists for other approaches which are inherently secure.

In practical cryptography, a physically unclonable function or PUF is a function that is embodied in a physical structure and is easy to evaluate, but hard to predict and assumed to be physically unclonable because of a strong dependence on uncontrollable aspects of the manufacturing process. PUFs have a unique challenge-response behavior. For these reasons, they are of interest as means of authentication. In this context, the term "physically unclonable key" (PUK) is used as a synonym for the term PUF.

Typically, a PUK owner should prove access to a secret by presenting his PUK to a verifying party. The verifying party sends a signal called challenge to the PUK, and the PUK then creates a unique and hard to predict reply signal which is called a response. This response is supplied back to the verifying party so that it can be verified that the PUK owner actually has authorized access to the secret or resource.

An example for a PUK is an optical PUK or optical key, the two expressions being used as synonyms within the present application. The PUK can in particular act on the basis of light scattering, either in transmission or in reflection operation mode. The PUK can, for example, be a pigment such as ZnO or $TiO_2$ provided on glass, or more stably in glass or glass ceramics (glass containing nanoparticles) or in PMMA (like a DVD), or ceramics or glass ceramics themselves. Another example is biologic material which has the potential to authenticate people by the unique properties of their body. Such unique biometric data can, for example, be teeth, bones or even parts of the human eye. These materials fulfill a general requirement for PUK interaction, namely, that the material of the PUK/the scattering media included in the PUK have a scattering mean-free path which is short. A rough surface alone cannot be used as a PUK, mostly because a surface geometry can be copied relatively easily, not because a surface is not complex.

EP 2 693 685 B1 describes a quantum secure device, system and method for verifying challenge-response pairs using an optical key, the disclosure of which is incorporated by reference herein in its entirety. EP 2 693 685 B1 describes wavefront shaping techniques which are applied to compensate for the PUK's light scattering behavior. A correctly compensated wavefront will be transformed back into a plane wave by wavefront shaping. This plane wavefront allows for focusing the received light and detecting a validation signal. Any other wavefront will create a random speckle pattern, no focusing is possible, and the validation fails. The disclosed device, system and method are also quantum secure. The system can in principle also be applied in the classical regime, its security then relying on strong statistics or the speed at which the response is provided, preventing digital emulation attacks.

A critical component for bringing the known authentication schemes like QSA (quantum-secure authentication) into practice is the optical key or PUK. Choosing an optical set-up component that can be used as a PUK is not trivial. It should have a very high positioning precision. This is required since the PUK's structure strongly varies over very small distances. Light incident on the PUK will consequently scatter very differently if the PUK has moved only slightly with respect to the incident light. If a PUK is to be reliably and repeatably used in authentication protocols, positioning precision in the order of the wavelength of the used light is required for the PUK.

In first demonstrator set-ups, the position of the PUK was permanently fixed with respect to the other optical components. In first steps for realizing a PUK that can be repeatably used in authentication protocols, a so-called kinematic base was used for holding the PUK. A kinematic base is a standard device in optics for mounting elements that need to be inserted and removed from the optical path with a high degree of repeatability and precision. Kinematic bases are commercially available and are manufactured and purchased by specialized firms (for example, Thorlabs®). A kinematic base basically comprises a top plate and a bottom plate that are securely coupled together by a sophisticated mechanism that allows for highly precise positioning and in particular repositioning. The coupling between the two plates normally works magnetically or mechanically.

In a respective demonstrator's set-up, the PUK material was permanently fixed (glued) to the removable plate (top plate) of the kinematic base. However, it surprisingly turned out in numerous experiments that the positional precision that could be achieved when putting the top plate back into place was not good enough for the intended purpose of PUK authentication.

SUMMARY

An aspect of the present invention is to provide a key holder for an optical key that allows for positioning an optical key with higher precision where a highly precise positioning is repeatedly possible. The key holder must furthermore be easy to manufacture and with comparatively low cost.

In an embodiment, the present invention provides a key holder which includes a ferrule, a multimode light guide at least partly embedded inside the ferrule, an optical key which comprises a light scattering material, and a mechanical mount which is configured to mount each of the ferrule, the multimode light guide, and the optical key. The multimode light guide comprises a front facet and a back facet which are arranged at opposite ends of the multimode light guide. The back facet of the multimode light guide contacts the optical key. The multimode light guide is configured so that light can enter into the multimode light guide via the front facet, propagate through the multimode light guide, be scattered by the optical key, and propagate back through the multimode light guide and exit via the front facet. The mechanical mount is further configured to be detachably connected to a mechanical mount terminator. The front facet of the multimode light guide is oriented in a direction of the mechanical mount terminator.

BRIEF DESCRIPTION OF THE DRAWINGS

The present invention is described in greater detail below on the basis of embodiments and of the drawings in which.

DETAILED DESCRIPTION

Figure 1:
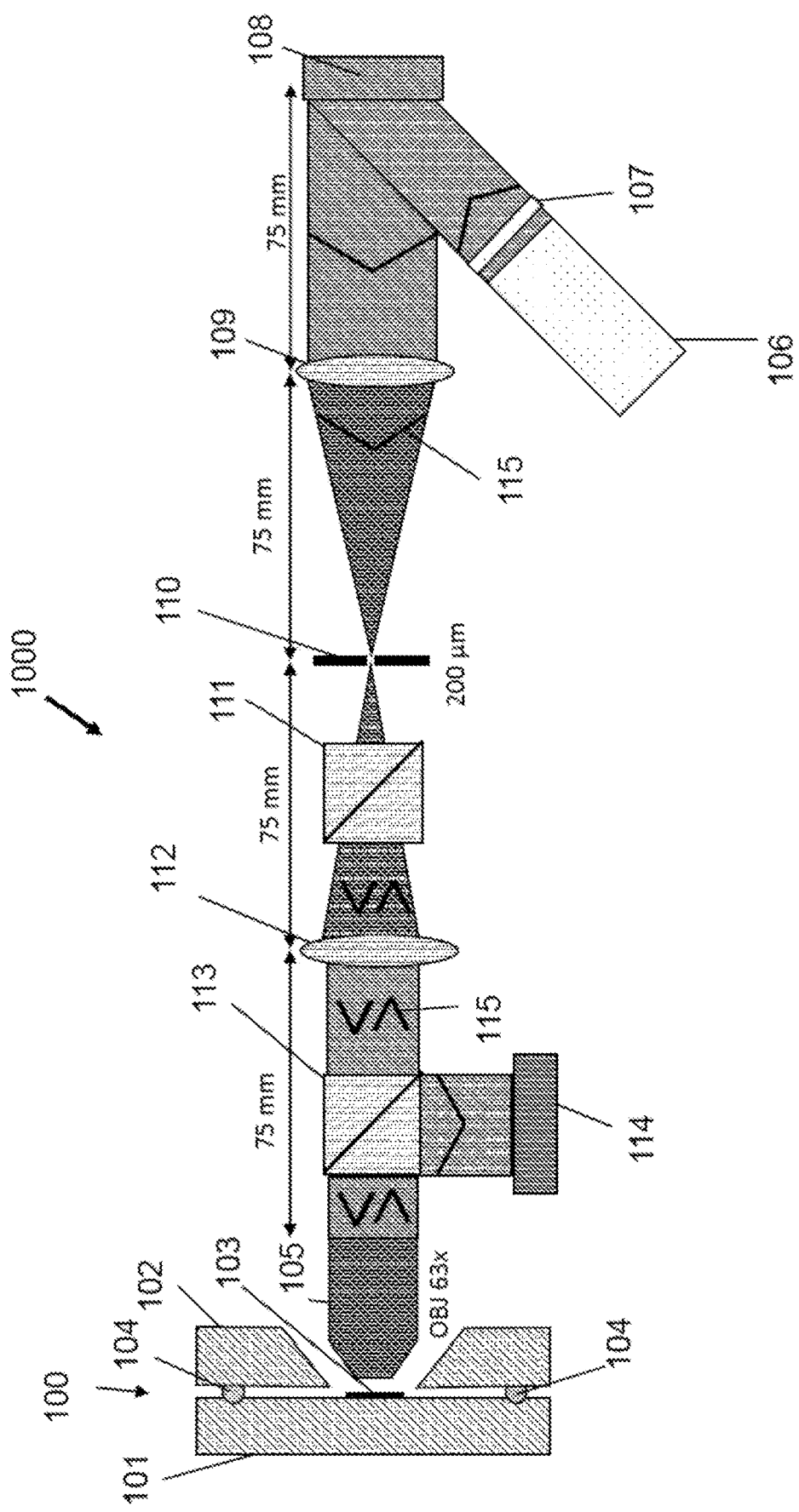
FIG. 1 schematically illustrates a set-up of a QSA demonstrator according to the state of the art, wherein a kinematic base is used as a key holder.

Facing the problem that known highly precise mounting mechanisms in optics are not suited as key holders for optical keys, the present invention provides combining mounting mechanisms which are already known from other technical fields with the specific requirements for a PUK mount. Fiber connectors already routinely achieve sub wavelength mounting accuracy. Fiber connectors have, however, to date only been used as devices for joining optical fibers. The present invention has therefore adapted known structures and characteristics of fibers and of fiber connectors for a key holder for an optical key/optical PUK (the two terms being used as synonyms within the present application).

In more detail, according to a first aspect of the present invention, the present invention is directed to a key holder comprising:
a ferrule;
a multimode fiber piece at least partly embedded inside the ferrule;
an optical key comprising a light scattering material; and
a mechanical mount mounting the ferrule, the multimode fiber piece and the optical key,
wherein the multimode light guide, in particular a multimode fiber piece, comprises a front facet and a back facet provided at opposite ends of the multimode light guide and wherein the back facet of the multimode light guide contacts the optical key,
wherein the multimode fiber piece is adapted so that light can enter into the multimode fiber piece via the front facet, propagate through the multimode light guide in particular via total internal reflection, be scattered by the optical key, and propagate back through the multimode light guide and exit via the front facet, and
wherein the mechanical mount is adapted to be detachably connected to a mechanical mount terminator, wherein the front facet of the multimode light guide is oriented in the direction of the mechanical mount terminator.

Light guides are optically transparent components such as fibers, tubes or rods that transport light over short or long distances. The light is conducted by reflection at the boundary surface of the light guide either by total reflection due to a lower refractive index of the medium surrounding the light guide or by mirroring at the boundary surface or by a suitable refractive gradient.

A multimode light guide according to the present invention can therefore be realized in different ways. A multimode light guide has the properties of: a) guiding light, and of, b) transporting a plurality of transverse spatial modes of light. Exemplary embodiments are therefore a multimode fiber, but also a bundle of single mode fibers. Other light guides that fulfil the above requirements a) and b) are furthermore also possible realizations.

The shape of a multimode light guide is in principle not restricted. In most cases, the multimode light guide has an elongated shape in the general direction of light transport, however, this can also be different. A cross section of the multimode light guide can, for example, be a circular cross section (which is the most common cross section for fibers) or a rectangular cross section or it can have another shape.

According to the present invention, a combination of a multimode light guide, in particular a multimode fiber piece, and an optical key are combined in a key holder for the very first time. The optical key contacting the back facet of the multimode light guide and the dimensions chosen for the multimode light guide allow the realization of the light propagation mechanism needed for a successful readout of the optical key. According to the present invention, light can enter into the multimode light guide, in particular into the multimode fiber piece, via the front facet, propagate through the multimode light guide, in particular via total internal reflection, be scattered by the optical key, and propagate back through the multimode light guide and exit again via the front facet. This light propagation must be possible for a significant amount of light. In other words, the light intensity of the light exiting via the front facet must not be too low, in particular if the key holder with the optical key is applied in a system for authenticating an optical key by verifying a match of challenge-response pairs in a quantum secure way. The light power entering the front facet is typically in the range of one or a few photons per challenge pulse (in a quantum secure approach, for example, with 200 photons) up to 100 mW, and the light power exiting via the front facet again is in the range of one or a few photons per pulse up to 100 mW. The efficiency $q=\text{Int}_{exit}/\text{Int}_{enter}$ must be comparatively high, for example, $q \geq 50\%$, for example, $q \geq 70\%$.

In an embodiment of the present invention, the multimode light guide can, for example, be a multimode fiber, or more precisely, a multimode fiber piece. Light normally propagates through a multimode fiber via total internal reflection. Total internal reflection within a fiber is possible for light meeting the core-cladding boundary of the fiber piece at an angle (measured relative to a line normal to the boundary) greater than the critical angle for this boundary. This critical angle is determined by the difference in index of refraction between the core and cladding materials. Rays that meet the boundary at a low angle are refracted from the core into the cladding where they terminate. The critical angle determines the acceptance angle of the fiber, often reported as the numerical aperture NA of the fiber. More precisely, the numerical aperture NA of a fiber is the sine of the critical angle of an incident beam. It is noted that light is focused to the front facet of the fiber for being coupled in. A high numerical aperture NA allows light to propagate down the fiber in paths (geometric optics; rays) both close to the axis and at the various angles, allowing efficient coupling of light into the fiber.

Because light must strike the boundary of the fiber with an angle greater than the critical angle, only light that enters the fiber within a certain range of angles can travel down the fiber without leaking out. This range of angles is called the acceptance cone of the fiber. This must be taken into consideration when combining the fiber with the optical key/optical key material at the back facet of the multimode fiber piece. The scattering of light back into the fiber must basically be considered as a new entrance condition of light so that light can successfully propagate back through the fiber.

According to the present invention, light propagating through the multimode fiber is scattered by the optical key being in contact with the back facet of the multimode fiber. Due to the scattering process, the direction of light differs significantly from ray to ray/photon to photon, and as a result, when scattered back, light re-enters the multimode fiber and propagates back through the multimode fiber in many different angles. Due to the scattering, the angle with which rays or photons meet the boundary of the fiber can also be comparatively small. According to an embodiment of the present invention, the numerical aperture NA of the multimode fiber can, for example, be chosen to be comparatively high. The numerical aperture NA of conventional optical fibers is typically in the range of 0.2 to 0.3 at maximum. It has turned out that this conventional range is not big enough for the purposes of the present invention. The following relation holds for the numerical aperture NA of the multimode fiber according to the present invention: $NA \geq 0.50$, for example, $NA \geq 0.66$. In principle, the numerical aperture NA can, for example, be realized as high as possible. A numerical aperture $NA \geq 0.70$ is, however, rare and difficult to obtain commercially and might lead to reflection or collection losses at the input facet. In an embodiment of the present invention, the following relation can, for example, hold: $0.70 \geq NA \geq 0.50$, for example, $0.70 \geq NA \geq 0.66$.

The concrete kind of contact between the multimode fiber/multimode light guide and the optical key can also be realized in different ways. Importantly, the back facet of the multimode light guide contacts the optical key, for example, the optical key contacts the complete back facet of the multimode light guide. It is also possible that the optical key is not only in contact with the back facet of the multimode light guide, but that the optical key also surrounds an end part or a region of the multimode light guide neighbored to the back facet. In these circumstances, the multimode light guide, more precisely one of its ends, is embedded into the optical key/the optical key material. It is noted that the term "contact" is here used in the optical sense, so a contact can also be realized with a material (for example, epoxy) having approximately the same refractive index as the fiber core.

According to the present invention, a multimode light guide is combined with the optical key in the key holder. Using a multimode light guide is necessary because challenge-response pairs are encoded in the spatial-frequency-domain. It is required that the transmission of the challenge to the optical key/PUK takes place via an optical channel containing many transverse spatial modes.

In an embodiment of the present invention, the following relation can, for example, hold for a diameter d of a core of the multimode light guide or the multimode fiber: $d \geq 80$ μm, for example, $d \geq 100$ μm. This is quite large for the diameter of a multimode fiber. However, this allows the use of a great number of transverse spatial modes inside the fiber. Typically, for authentication purposes with lots of light (for example a few mW), more than 10000 modes in a fiber can, for example, be used. The diameter d and the number of modes in a fiber are inherently coupled. In a quantum secure authentication procedure, the number of photons can, for example, be far below the number of modes. For example, a few 1000 modes are controlled, but the number of photons is approximately 200.

The present invention provides that the multimode light guide is at least partly embedded inside the ferrule. For example, a part of the multimode light guide embedded inside the ferrule can be glued into the ferrule, for example, by using epoxy. Parts of the multimode light guide not embedded inside the ferrule can be fully or at least partly in contact or embedded by the optical key, or more precisely, by the optical key material. The optical key itself can have a defined shape, for example, it can be provided as a cylinder or a plug. It is also possible, however, that the optical key has no fixedly defined shape, but is just embodied as a material just contacting or surrounding/embedding the back facet of the multimode light guide. The "shape" of such an optical key can also be defined by surrounding conditions, for example, the provision of another mechanical part in the key holder.

The shape of the ferrule can, for example, be rotationally symmetric; in other words, the ferrule can, for example, have a standard shape and its cross section can, for example, be a circular ring. It is therefore possible to use existing standard ferrules for realizations of the present invention. However, the shape of the ferrule, in particular its inner and/or outer cross-sectional shape, can in principle also be different, for example, rectangular.

According to the present invention, the key holder comprises a mechanical mount for mounting the ferrule, the multimode fiber piece and the optical key. The mechanical mount can here mount the ferrule, the multimode light guide and the optical key directly or indirectly. In an embodiment of the present invention, the mechanical mount can, for example, directly mount the ferrule and the optical key, but not the multimode light guide which is provided inside the ferrule and the optical key material. Direct mounting here means direct contact of the part to be mounted and the mount. Indirect mounting means that another material or part can be inserted between the part to be mounted and the mount. The mechanical mount itself can furthermore comprise a plurality of parts.

According to the present invention, the mechanical mount is adapted to be detachably connected to a mechanical mount terminator, wherein the front facet of the multimode light guide is oriented in the direction of the mechanical mount terminator. The mechanical mount terminator is not part of the key holder. The mechanical mount of the key holder and the mechanical mount terminator are, however, both constructed to fit together. With respect to the intended use for authentication purposes of the key holder with the optical key, it is important that the front facet of the multimode light guide is oriented in the direction of the mechanical mount terminator when the mechanical mount is connected to the mechanical mount terminator. Light probing the optical key enters into the multimode light guide through the front facet and also exits via the front facet after having been scattered by the optical key. The front facet of the multimode light guide must therefore be oriented in the direction of the mechanical mount terminator.

According to the present invention, the mechanical mount is adapted to be detachably connected to a mechanical mount terminator. This means that the key holder with the mechanical mount can be detached without any damage from the mechanical mount terminator. It is instead intended to repeatedly connect and disconnect the mechanical mount and the mechanical mount terminator.

In an embodiment of the present invention, the mechanical mount can, for example, be adapted to be connected to a mechanical mount terminator by a click mechanism or a screw mechanism. Both kinds of mechanism are in principle known from fiber connectors according to the state of the art. It is alternatively possible that the mechanical mount is adapted to be connected to a mechanical mount terminator by a magnetic mechanism. The state of the art describes different kinds of fiber connectors which have proven that a highly precise connection mechanism in the form of a click mechanism or a screw mechanism work: LC-fiber connectors and SC-fiber connectors apply a click mechanism when connected to a corresponding fiber connector terminator. FC-fiber connectors and ST-fiber connectors are provided with a screw mechanism when connected to the respective fiber connector terminators. These known principles can be transferred to the key holder and the mechanical mount according to the present invention.

In an embodiment of the present invention, the mechanical mount can, for example, comprise a rotation stop mechanism for enhancing the positional accuracy when connecting the mechanical mount to a mechanical mount terminator. If a connection between two parts of a fiber is only needed for a secure transfer/transport of light, a rotation of the two parts with respect to one another normally does not have a negative influence per se. This is different, however, when it comes to the use of fibers for the purposes of authentication applying an optical key. Since the individual scattering pattern of the optical key is here essential for a successful authorization, a rotation of the optical key material with respect to any detection means outside the key holder must be avoided. The rotation stop mechanism can be provided by a single part or by several parts. It is noted that a rotation stop mechanism as such is already known from special fiber connectors which are used when the polarization of light must be kept constant during a light transfer/a light coupling process. Concepts known from these special fiber connectors can be transferred to the present invention.

In an embodiment of the present invention, the rotation stop mechanism can, for example, comprise a guiding ring coaxially provided with the ferrule and outside the ferrule, the guiding ring being adapted to be slidably guided inside or outside around the corresponding terminator guiding ring provided at the mechanical mount terminator, the guiding ring comprising at least one radially protruding pin for securing the mechanical mount against rotation in the mechanical mount terminator. The mechanical mount terminator can, for example, be provided with a respective bore hole which accepts the protruding pin of the mechanical mount. The guiding ring of the key holder and the terminator guiding ring are constructed to fit one another in a sliding way so that one guiding ring contacts the other guiding ring of the outer face or on the inner face. The order of the rings in the radial direction does not in principle matter, both orders are possible. The radially protruding ring can consequently be radially protruding to the outside or to the inside as well (positive and negative radial direction).

In an embodiment of the present invention, the mechanical mount can, for example, comprise a push mechanism, for example, a spring mechanism, for pushing the multimode light guide towards a mechanical mount terminator when connecting the mechanical mount to a mechanical mount terminator. This allows for a better connection between the mechanical mount and the mechanical mount terminator and therefore for a tighter and more precise positioning of the front facet of the multimode light guide through which light exits the key holder again.

The spring mechanism can in principle be embodied in one part or by a plurality of parts. Spring mechanisms as such are known in the art.

In an embodiment of the present invention, the mechanical mount can, for example, comprise a ferrule mount that is basically provided in the form of a hollow cylinder, wherein an end part of the ferrule is provided inside the hollow cylinder and wherein at least a part of the optical key is also provided inside the hollow cylinder, the end part of the ferrule and the part of the optical key being connected to the ferrule mount, respectively. The back facet of the multimode light guide can, for example, therefore provided inside the ferrule mount, more precisely inside the hollow cylinder of the ferrule mount. It is, for example, possible that the ferrule and the part of the optical key are glued to the hollow cylinder of the ferrule mount. Other kinds of connections are also, however, possible. The ferrule can for instance also be screwed or clamped into the hollow cylinder. The optical key can, for example, also embed an end part of the multimode light guide and not only contact the back facet of the multimode light guide, exclusively.

In an embodiment of the present invention, the optical key can, for example, be provided completely inside the ferrule. Parts of the ferrule can therefore surround or be filled with the multimode light guide or the optical key. It is also, however, possible that a remaining part of the ferrule which is arranged more distant to the front facet of the multimode light guide than the optical key be filled with a filling (shape stabilizing) material or that this remaining part even be empty. Referring back to the previously described embodiment, it is then possible that the mechanical mount comprises a ferrule mount that is basically provided in the form of a hollow cylinder, wherein an end part of the ferrule is provided inside the hollow cylinder and is connected to the ferrule mount. The optical key can also be provided inside the hollow cylinder, but it can be also arranged outside the hollow cylinder, depending on the length of the multimode light guide. The multimode light guide and the optical key together in principle have a length in the direction of the axis of the ferrule that is equal to or shorter than the length of the ferrule in said direction. It is also possible that the multimode light guide is extremely short or that the multimode light guide be completely omitted. It can then be said that the optical key and the multimode light guide are combined into one element. The optical key is as a result then provided directly at the front facet of the ferrule.

According to a preferred embodiment of the present invention, the ferrule mount is provided inside a casing of basically cylindrical shape, wherein a spring mechanism coupled to the ferrule mount and the casing is provided inside the casing to push the towards a mechanical mount terminator. The casing is part of the mechanical mount as well. By pushing the ferrule mount towards a mechanical mount terminator, the front facet of the multimode light guide is pushed towards the mechanical mount terminator as well since the multimode light guide is mounted to the ferrule mount. This measure contributes to more precise positioning of the key holder with respect to the mechanical mount terminator and a detector system for validating the optical key.

In an embodiment of the present invention, a spatial positional accuracy of the mechanical mount with respect to a mechanical mount terminator can, for example, be is equal to or better than 1 μm in each of the three spatial directions and/or and angular positioning accuracy of the mechanical mount with respect to a mechanical mount terminator can, for example, be equal to or better than 1° in each of the three angular directions. The three spatial directions and the three angular directions can here in principle be freely chosen. It makes sense in practice, however, to define the three spatial directions as the directions of the three principal axes of the key holder, and to define the three angular directions as rotations around each of these principal axes. The precision mentioned above can be realized with one or more of the measures described above in more detail. If the accuracies are better that 1 μm, this accuracy is in the order of magnitude of the wavelength typically applied for authentication purposes.

As already described in the introductory part of the present application, different materials can in principle be used as a part of or as a PUK material. The material of the PUK/the scattering media included in the PUK have a scattering mean-fee path which is short and well controlled. In an embodiment of the present invention, the optical key comprises a material mixture of epoxy and scattering particles, for example, a mixture of epoxy and zinc oxide powder. Using a material mixture of epoxy and scattering particles has the advantage that fixing the multimode light guide to the ferrule and providing the optical key on the back facet of the multimode light guide becomes easier in the manufacturing processes. Epoxy can be used to normally glue the multimode light guide to the ferrule. It can then also be used to glue the scattering particles to the back facet of the multimode light guide as well as possibly to neighboring regions/the end part of the multimode light guide. It is then easiest to mix the epoxy and the scattering particles and to provide this material mixture for connection purposes. For the epoxy or an alternative material into which the scattering materials are embedded, it is also necessary that it is optically transparent and that its refractive index is, for example, rather close to the refractive index of the light guide core or fiber core.

In an embodiment of the present invention, the optical key can, for example, be provided as a plug, in particular a plug comprising a light scattering ceramic. It is possible that the plug only contacts a back facet of the multimode light guide, however, the plug can, for example, comprise an opening or a small borehole into which the multimode fiber can be inserted. The inserted part of the multimode light guide can additionally be glued to the plug, for example, by epoxy.

In an embodiment of the present invention, the optical key can, for example, comprises a ceramic material, in particular a glass ceramic material with at least two different phases, wherein at least one of the phases defines a structure which determines the response of the optical key when receiving the challenge created for authentication purposes. Different kinds of ceramic materials that are suited as optical key are already known. More detailed information also about the thermal reliability of optical keys is described in the EP 3 252 740 B1, the entirety of which is incorporated by reference herein.

The numerous embodiments of the key holder as described above can be combined with one another fully or in part as long as no technical contradictions occur.

According of a second aspect of the present invention, the present invention is directed to a system comprising:
  the key holder as defined in any one of the embodiments as described above comprising the mechanical mount; and
  a mechanical mount terminator,
  wherein the mechanical mount is detachably mounted or detachably mountable to the mechanical mount terminator. The mechanical mount terminator will in practice be used in combination with a plurality of key holders since it is realistic that a plurality of people having a plurality of optical keys ask for authentication for the same system/secret.

In an embodiment of the present invention, the accuracy with which the key holder is detachably mountable or detachably mounted to the mechanical mount terminator can, for example, be equal to or better than 1 μm. The angular positioning accuracy can, for example, be equal to or better than 1°, for example, equal to or better than 0.5°, for example, equal to or better than 0.1°. Concerning the details of the named precision, reference is made to the respective paragraph in the description of the key holder describing and further defining the spatial positioning accuracy and the angular positioning accuracy.

In an embodiment of the present invention, the system can, for example, further comprise an objective, wherein the mechanical mount terminator is fixedly arranged with respect to the objective. The objective can, for example, be part of a system for authenticating an optical key by verifying a match of a challenge-response pair. The objective can, however, in principle be provided for other purposes or reasons. The optical axis of the objective can, for example, be aligned with the optical axis of the mechanical mount terminator and also aligned with the optical axis of the multimode light guide. This allows for an easier alignment of the different parts with respect to one another. The objective is used to focus light onto the front facet of the multimode light guide, the light then entering into the multimode light guide.

In an embodiment of the present invention, the mechanical mount terminator can, for example, comprises a base plate having a through-hole facing the front facet of the multimode light guide when the mechanical mount is mounted to the mechanical mount terminator. Light used for probing the optical key can therefore pass the mechanical mount terminator without obstruction and can directly enter the multimode fiber piece.

In an embodiment of the present invention, the base plate can, for example, further comprise a ring-shaped reception part which is coaxially arranged with the optical axis of the system, the reception part being adapted for receiving at least part of the ferrule. The dimensions of the ring-shaped reception part and of the outer face of the ferrule are adapted to one another. The ferrule can therefore be slidingly inserted into the ring-shaped reception part. The position of the ferrule is stabilized by the contact to the ring-shaped reception part.

In an embodiment of the present invention, the base plate can, for example, further comprise a ring-shaped fixation part which is coaxially arranged with respect to the ring-shaped reception part and which is arranged radially outside and with a radial distance to the reception part, the ring-shaped fixation part comprising a bore hole for receiving a pin of the mechanical mount in order to secure the mechanical mount and the mechanical mount terminator against relative rotation. The mechanical mount terminator therefore basically comprises a base plate with a protruding double ring structure. The outer ring is the ring-shaped fixation part, the inner ring is the ring-shaped reception part. In addition to its function as a rotation stop, the ring-shaped fixation part can, for example, be intended for fixing and in particular for detachably fixing the fixation part to a corresponding fixation part of the mechanical mount. The fixation mechanism can, for example, be a screw mechanism or a click mechanism as already described above. The bore hole provided within the ring-shaped fixation part is oriented parallel to the optical axis of the system/the mechanical mount terminator.

The embodiments of the system as described above can be fully or partly combined with one another as long as no technical contradictions occur.

According to a third aspect of the present invention, the present invention is directed to a system for authenticating an optical key by verifying a match of a challenge-response pair, comprising:

a challenge forming device for forming a challenge;
an optical key which comprises a scattering material and is receptive to the challenge forming device;
a response verifying device which is receptive to the response provided by the optical key for verifying if the response provided by the optical key matches the challenge form by the challenge forming device,
characterized by the system as described above in numerous embodiments according to the second aspect of the present invention, wherein the optical key is held by the key holder. The key holder as such has been described with respect to the first aspect of the present invention according to several embodiments. The system to which the system for authenticating an optical key by verifying a match of a challenge-response pair refers back is a simple system combining the key holder as described above and the mechanical mount terminator, wherein the mechanical mount is detachably mountable or detachably mounted to the mechanical mount terminator.

Systems for authenticating an optical key by verifying a match of a challenge-response pair are in principle known, however, the characterizing feature according to the present invention is embodied by the specific key holder which is mounted to the corresponding mechanical mount terminator. With respect to systems for authenticating an optical key by verifying a match of a challenge-response pair, reference is made to the EP 2 693 685 B1, the entirety of which is incorporated by reference herein, and to EP 3 252 740 B1, the entirety of which is incorporated by reference herein.

In an embodiment of the present invention, in the system for authenticating an optical key by verifying a match of a challenge-response pair the following relation holds:

$q = \text{Int}_{exit}/\text{Int}_{enter} \geq 50\%$, for example, $q \geq 70\%$, wherein $\text{Int}_{enter}$ is the intensity of light entering the multimode light guide via the front facet and $\text{Int}_{exit}$ is the intensity of light exiting the multimode light guide via the front facet after having been scattered by the light scattering material of the optical key. The ratio q (light efficiency) provides that in particular for quantum secure systems, the light intensity exiting the front facet of the multimode light guide is high enough that a response verification and/or detection of the response or its validity can be successfully undertaken.

In an embodiment of the present invention, the present invention is directed to a mechanical mount terminator which is adapted to fit to the mechanical mount of the key holder as described above in various embodiments. The mechanical mount terminator can furthermore have a feature or several features of the mechanical mount terminator further described with respect to the system according to the second aspect of the invention, said system comprising the key holder with a mechanical mount and the mechanical mount terminator, wherein the mechanical mount is detachably mountable or detachably mounted to the mechanical mount terminator.

The above-described aspects of the present invention can be combined fully or in part with one another, the same holds for the numerous embodiments according to the numerous aspects of the present invention, as long as no technical contradictions occur.

The present invention is described in greater detail below under reference to the drawings where same reference signs indicate the same features.

FIG. 1 schematically illustrates a set-up of a QSA demonstrator 1000 according to the state of the art wherein a kinematic base 100 is used as a key holder. The depicted set-up is just an example, other set-ups are also possible and are in principle known by the person skilled in the art. A coherent light source, for example, a laser 106, emits laser pulses having a flat wavefront in the depicted example. The laser pulse with a flat wavefront enters a DMD (digital micromirror device) 108, for example, a spatial light modulator SLM which acts on the phase and/or amplitude of the flat wavefront and shapes the wavefront into a random or irregular wavefront. The pulse with the random or irregular wavefront represents the challenge. The propagation direction of the light is indicated by the arrows 115 shown in the drawing. Light exiting the DMD 108 passes through a lens 109 and an aperture 110, and then passes through a beam splitter 111 and another lens 112. The light then passes through a partial beam splitter 113 and is focused by an objective 105 onto an optical key 103 which is provided on a kinematic base 100. In more detail, the Fourier transform of the shaped wavefront is projected onto the key, via the objective 105. This is because the optical key 103 is positioned in the image plane of the aperture 110, which in turn is positioned in the Fourier plane of the DMD 108.

Light that is scattered/reflected by the optical key 103 propagates back through the objective 105 and afterwards through the polarizing beam splitter 113. The light then enters a camera or CCD 113. A half-wave plate 107 is additionally provided in the beam path. It is noted that additional optical components can also be provided within the beam path, the depicted drawing just being an illustration of the principles of the QSA demonstrator set-up 1000. If the challenge sent to the optical key 103 and the response created by a scattering by the optical key 103 match, this match can be detected by the CCD 114. In an embodiment, the response is a sharp focus at a particular spot out of a number (typically between 2 and 100) of possible spots. Generating only one or a few spots at preselected location(s) for verifying challenge-response pairs has the advantage that the verification can be carried out with only a few photons, and thus (also) quantum secure. Larger response patterns do not have this advantage.

Described differently, the QSA demonstrator set-up 1000 is an example for a system for authenticating an optical key 103 by verifying a match of the challenge-response pair, comprising a challenge forming device 108 for forming a challenge, an optical key 103 which comprises a scattering material and is receptive to the challenge formed by the challenge forming device 108, a response verifying device 114 which is receptive to the response provided by the optical key 103 for verifying if the response provided by the optical key 103 matches the challenge formed by the challenge forming device 108. In the depicted example, the optical key 103 is held by a key holder which is embodied as kinematic base 100.

The kinematic base 100 is in principle built up as follows: The kinematic base 100 comprises a top plate 101 and a bottom plate 102. The two plates 101 and 102 are securely coupled together by a sophisticated mechanism that can, for example, work mechanically or magnetically. In the depicted example, structures 104 provide exact positioning and repositioning of the top plate 101 onto the bottom plate 102. The top plate 101 can be termed a key holder since it holds the optical key 103. In the depicted example, the PUK material is glued to the bottom plate 101 and the PUK material 103 is provided in the focal plane of the objective 105.

Despite the fact that kinematic bases like the kinematic base 100 are standard devices in optics for mounting elements that need to be inserted and removed from the optical path with a high degree of repeatability and precision, it has turned out that the positioning precision that could be achieved when putting the top plate 101 back into place onto the bottom plate 102 was not good enough for the intended purpose of PUK authentication. Active alignment tools could be tested whether they can achieve the necessary precision, however, they are much more complex and hence, costly.

The present invention solves this technical problem by providing a key holder for an optical key that allows for positioning an optical key with higher precision. Highly precise positioning is in particular repeatedly possible according to the present invention. It shall furthermore be realized comparatively easy and with comparatively low cost.

Figure 2:
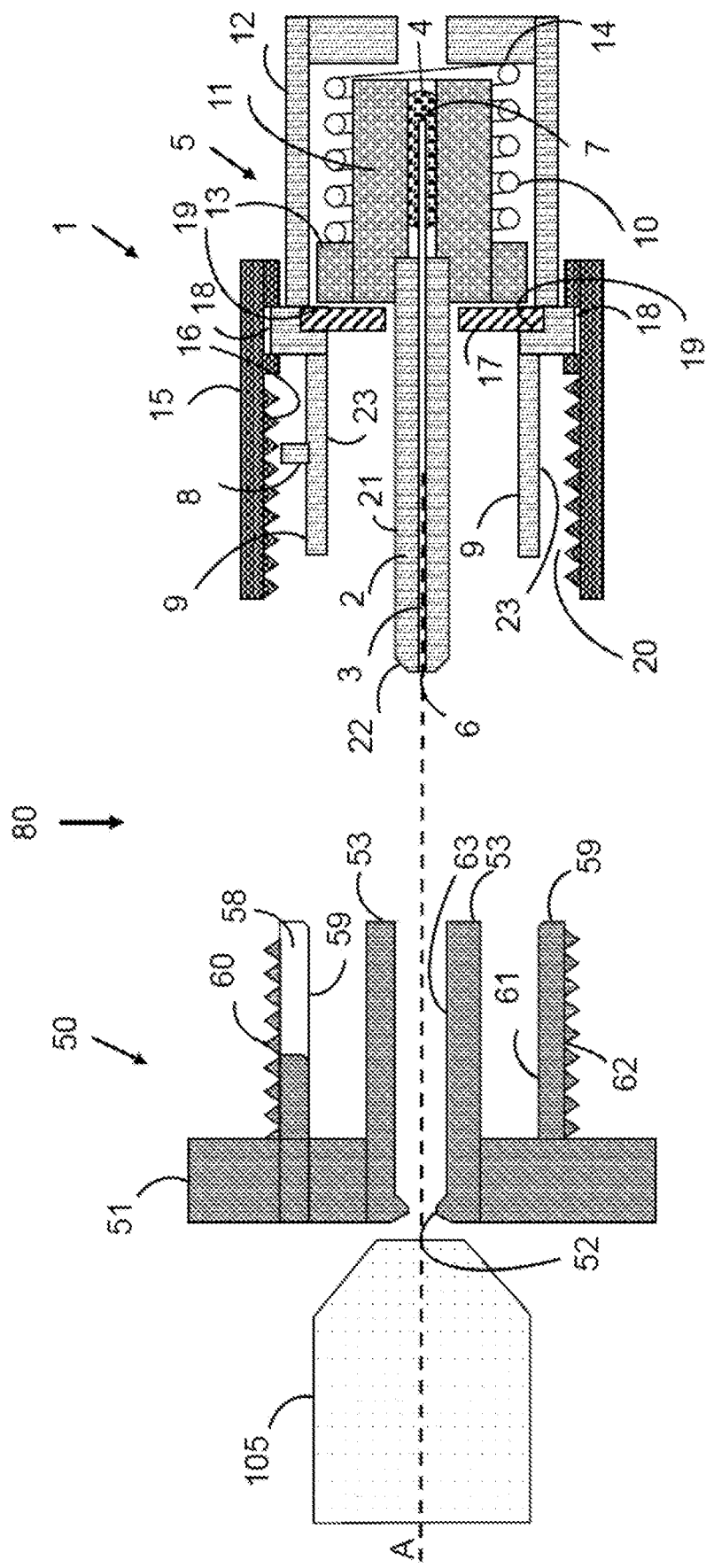
FIG. 2 schematically illustrates a sectional view of a system comprising a key holder with an optical key and a mechanical mount terminator according to a first embodiment of the present invention when the key holder is demounted.

FIG. 2 schematically illustrates a sectional view of a system 80 comprising a key holder 1 with an optical key 4 and a mechanical mount terminator 50 according to the present invention when the key holder 1 is demounted. The key holder 1 comprises a ferrule 2 and a multimode light guide 3 that is partly embedded inside the ferrule 2. In the depicted embodiment, the multimode light guide is realized as a multimode fiber piece 3. Other realizations of the multimode light guide 3 are also, however, possible in this and in the following embodiments. The key holder 1 further comprises an optical key 4 comprising a light scattering material and a mechanical mount 5 mounting the ferrule 2, the multimode fiber piece 3, and the optical key 4. In the presented example, the ferrule 2 and the optical key 4 are directly mounted and are in direct contact with a ferrule mount 11, whereas, in contrast thereto, the multimode fiber piece 3 is only indirectly mounted since it is provided inside the ferrule 2 and inside the optical key material 4, respectively.

The multimode fiber piece 3 comprises a front facet 6 and back facet 7 provided at opposite ends of the multimode fiber piece 3. The back facet 7 of the multimode fiber piece 3 contacts the optical key 4. In the present example, the contact is not just at the back facet 7, but a region of the multimode fiber piece 3 neighboring the back facet 7 is also embedded inside the optical key 4 or the optical key material 4. In the present case, the optical key 4 comprises a material mixture of epoxy and scattering particles, for example, a mixture of epoxy and zinc oxide powder. A material can, for example, be used with low thermal expansion properties, for example, F123 epoxy. Other materials can also be used as the PUK material.

According to the present invention, the multimode fiber piece 3 is adapted so that light can enter into the multimode fiber piece 3 via the front facet 6, propagate through the multimode fiber piece 3 via total internal reflection, can be scattered by the optical key 4, propagate back through the multimode fiber piece 3, and exit the multimode fiber piece 3 via the front facet 6 of the multimode fiber piece. In order to provide this requirement, a fiber with a numerical aperture of 0.66 was applied in the present example, furthermore, the fiber core had a diameter d=100 μm. It is noted that other characteristics of the fiber could have been applied. The numerical aperture NA of the multimode fiber piece 3 can, for example, be equal to or greater than 0.50, for example, NA 0.66. A diameter d of a core of the multimode fiber piece 3 can, for example, furthermore fulfill the relation d 80 μm, for example, d 100 μm.

The mechanical mount 5 of the key holder 1 will be further described below. The mechanical mount 5 in principle comprises several different functional parts. It basically comprises a ferrule mount 11 that is basically provided in the form of a hollow cylinder, wherein an end part of the ferrule 2 is provided inside the hollow cylinder 11 and wherein at least a part of the optical key 4 (here: the entire optical key 4) is also provided inside the hollow cylinder 11. The end part of the ferrule 2 and the part of the optical key 4 are connected to the ferrule mount 11, respectively. In the depicted embodiment, both parts are glued to the ferrule mount 11. In the present embodiment, the ferrule 2 is glued to the ferrule mount 11 exclusively using epoxy. The optical key 4 comprises a material mixture of epoxy and scattering particles, the material of the optical key 4 can therefore also be used for gluing purposes. Other materials or methods can, however, be used for connecting the ferrule 2 and the optical key 4 to the ferrule mount 11. If the optical key 4 is provided fully or at least partly inside the ferrule mount 11, the optical key 4 is well protected against mechanical damage like scratches etc. It is noted that mechanical damage and in particular scratches can alter the response of the optical key 4 when probed with an optical challenge which can irreversibly destroy the optical key 4.

The ferrule mount 11 is provided inside a casing 12 of basically cylindrical shape. A spring mechanism comprising a spring 10 is furthermore coupled to the ferrule mount 11 and the casing 12. The coupling contact occurs in the areas depicted with reference signs 13 and 14 shown in the drawings as an example. Due to the spring mechanism, the ferrule mount 11 is therefore pushed towards the mechanical mount terminator 50 when the mechanical mount 5 is mounted to the mechanical mount terminator 50.

The mechanical mount 5 furthermore comprises a rotation stop mechanism for enhancing the positional accuracy when connecting the mechanical mount 5 to the mechanical mount terminator 50. In the depicted embodiment, the mechanical mount 5 therefore comprises a guiding ring 9 which is provided coaxially with ferrule 2 and is arranged outside the ferrule 2. The guiding ring 9 is adapted to be slidably guided inside or outside (here: inside) a corresponding terminator guiding ring 59 provided at the mechanical mount fiber terminator 50. The guiding ring 9 comprises a protruding pin 8 for securing the mechanical mount 5 against rotation in the mechanical mount terminator 50. It is also possible, however, to provide two or more pins for realizing a rotational lock.

The mechanical mount 5 of the key holder 1 additionally comprises a ring-shaped coupling nut 15 with a thread 16. The coupling nut 15 comprises a recess 18 into which an end part of the guiding ring 9 is positioned. The coupling nut 15 can in this way be rotated around the inner parts and in particular around the guiding ring 9 of the key holder. The guiding ring 9 is mechanically coupled to the ferrule 2 comprising the multimode fiber piece 3 via the ferrule mount 11. It is therefore possible that the orientation of the multimode fiber piece 3 stays the same when the mechanical mount 5 is connected to the mechanical mount terminator 50 via the depicted screw mechanism. The mechanical mount 5 could alternatively be connected to the mechanical mount terminator 50 by a screw mechanism or via a magnetic mechanism.

A ring 17 is provided inside a recess 19 on the end part of the guiding ring 9. The recess 19 is there to mount ring 17. The ring 19 prevents the ferrule mount 11 from falling out of the casing 12.

The mechanical mount terminator 50 shall be further described below. The mechanical mount terminator 50 comprises a base plate 51 having a through-hole 52 facing the front face 6 of the multimode fiber piece 3 when the mechanical mount 5 is mounted to the mechanical mount terminator 50. The base plate 51 further comprises a ring-shaped reception part 53 which is coaxially arranged with the optical axis A of the system. The reception part 53 is adapted for receiving at least part of the ferrule 2 and its inner diameter is adapted to fit to the outer diameter of the ferrule. In the depicted embodiment, the ferrule 22 comprises a tapered part and an end part of the ring-shaped reception part 53 also comprises a respectively tapered part.

The base plate 51 further comprises a ring-shaped fixation part 59 which also functions as a terminator guiding ring 59. This ring-shaped fixation part 59 is coaxially arranged with respect to the ring-shaped reception part 53 and is arranged radially outside and with a radial distance to the reception part 53. The ring-shaped fixation part 59 comprises a bore hole 58 for receiving the pin 8 of the mechanical mount 5 of the key holder 1 to secure the mechanical mount 5 and the mechanical mount terminator 50 against relative rotation. A thread 60 is provided on the outer face 62 of the terminator guiding ring 59. In other words, the terminator guiding ring 59 is adapted to provide two different functions. On its outer face, it provides a coupling mechanism in terms of the threads 60, on its inner face 61, it provides a guiding function for correctly positioning the guiding ring 9. The inner diameter of the terminator guiding ring 59 is adapted to fit to the outer diameter of the guiding ring 9 of the mechanical mount 5. They can be in sliding contact.

An objective 105 is also depicted in FIG. 2. The objective 105 focuses light onto the front facet 6 of the multimode fiber piece 3 when the key holder 1 is mounted to the mechanical mount terminator 51. The objective 105 and the mechanical mount terminator 50 are arranged in a fixed distance and a fixed orientation with respect to one another. This provides a higher accuracy in authenticating procedures.

Figure 3:
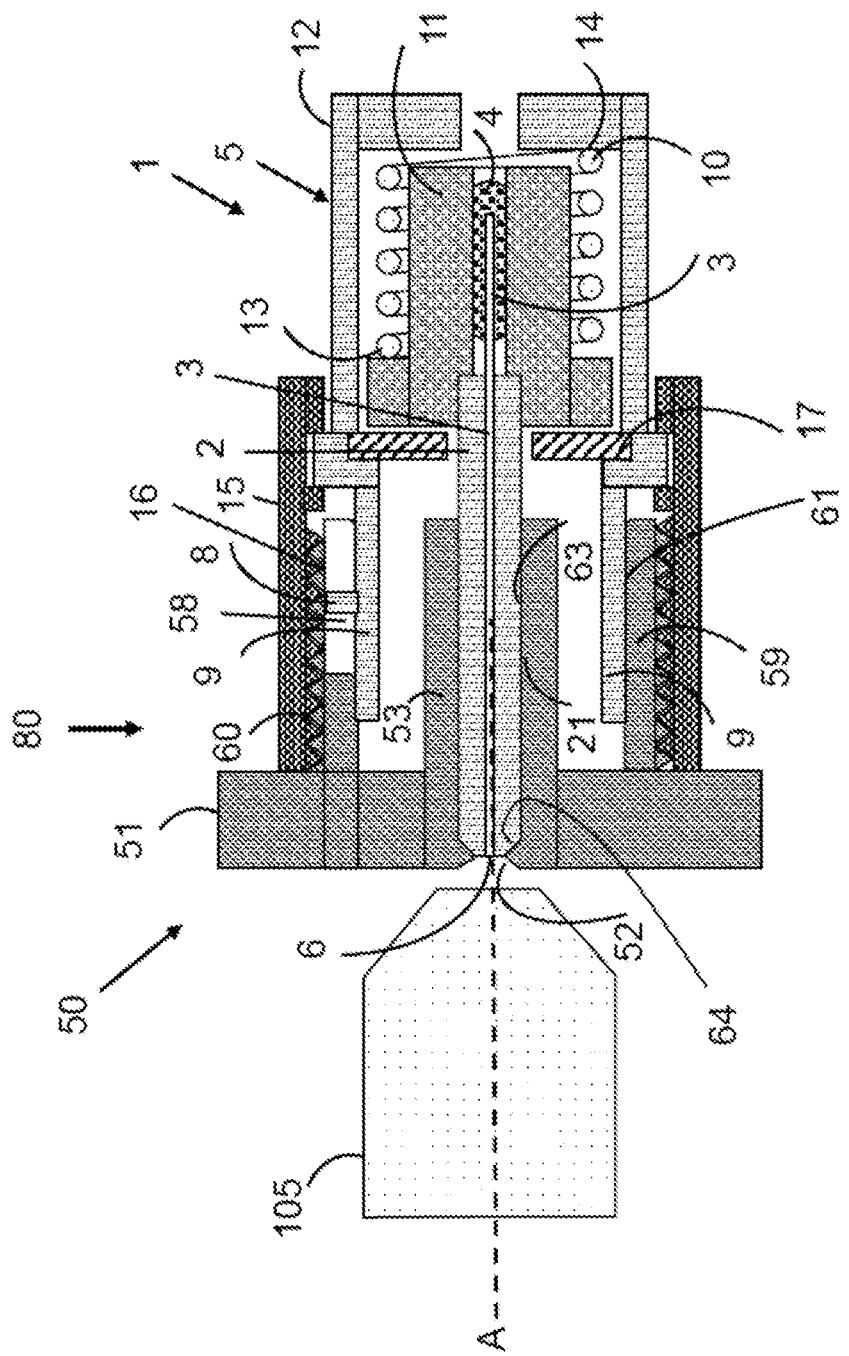
FIG. 3 schematically illustrates a sectional view of the system shown in FIG. 2 when the key holder with the optical key is mounted.

FIG. 3 schematically illustrates a sectional view of the system shown in FIG. 2 when the key holder 1 with the optical key 4 is mounted. Same reference signs thereby indicate the same features. The mechanical mount 5 is connected to the mechanical mount terminator 50 by a screw mechanism. FIG. 3 shows that the thread 16 of the coupling nut 15 engages with the thread 60 of the terminator guiding ring 59 of the mechanical mount terminator 50. The guiding ring 9 is furthermore in sliding contact with the inner face 61 of the terminator guiding ring 59. The pin 8 is furthermore guided inside the bore hole 58 provided in the terminator guiding ring 59.

The ferrule 2 is inserted into the ring-shaped reception part 53 radially inside with respect to the fixation mechanism and rotation stop mechanism. The outer face 21 of the ferrule is in sliding contact with the inner face 63 of the terminator guiding ring 59. The tapered section 22 of the ferrule 2 is furthermore in contact with the respective tapered section provided in the ring-shaped reception part 53. The spring 10 pushes the multimode fiber piece 3 provided inside the ferrule 2 into the direction of the objective 105.

Figure 4:
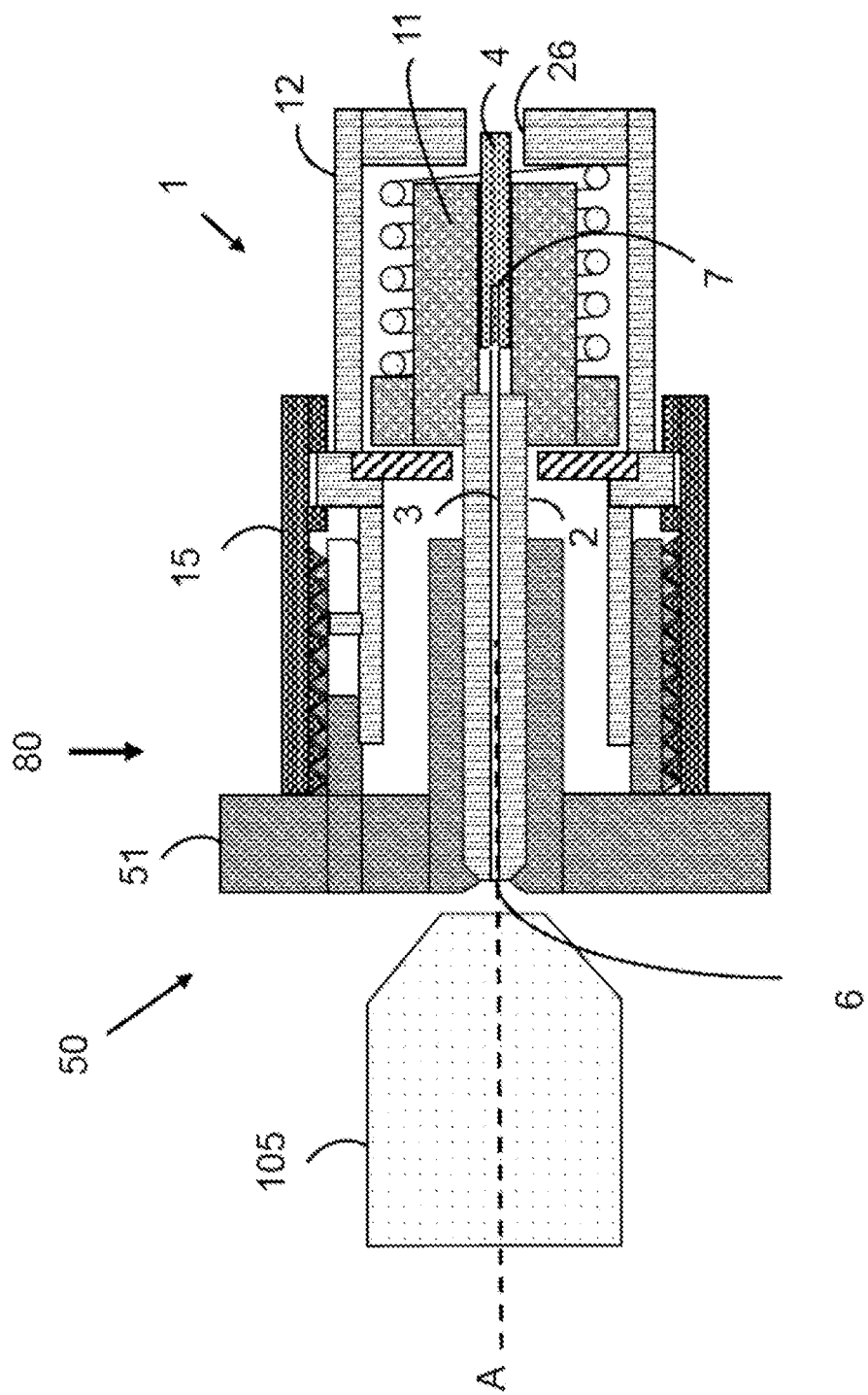
FIG. 4 schematically illustrates a second embodiment of the invention with a different optical key.

FIG. 4 schematically illustrates a second embodiment of the present invention with a different optical key 4. The following will concentrate on the differences between the second embodiment and the first embodiment. Apart from these differences, the first embodiment and the second embodiment are identical. Whereas in FIG. 3 the optical key comprises a material mixture of epoxy and scattering particles, the optical key depicted in FIG. 4 is provided as a plug. In the depicted second embodiment, the plug comprises a ceramic. It can be a glass ceramic plug which has advantageous material properties. It can in particular have a thermal reliability parameter which is lower than 1/(200,000 Kelvin) where the thermal reliability parameter is the absolute value of one or more summed up temperature coefficients of the optical key 4, and where the thermal reliability parameter is in particular the temperature coefficient of the optical path length $\{1/S\} \{ds/dT\}$. For further details, reference is made to EP 3 252 740 B1 which describes further details about the material properties of the optical key 4.

In the depicted embodiment, the ceramic plug 4 comprises a bore hole into which the end part with the back facet 7 of the multimode fiber 3 is inserted. The scattering plug 4 can, for example, be optically glued to the end of the fiber 3. The plug 4 could in addition also be connected or glued to the ferrule mount 11. The plug 4 could alternatively be only in contact with the back facet 7 of the multimode fiber piece 3 without embedding the end part of the multimode fiber piece 3.

Figure 5:
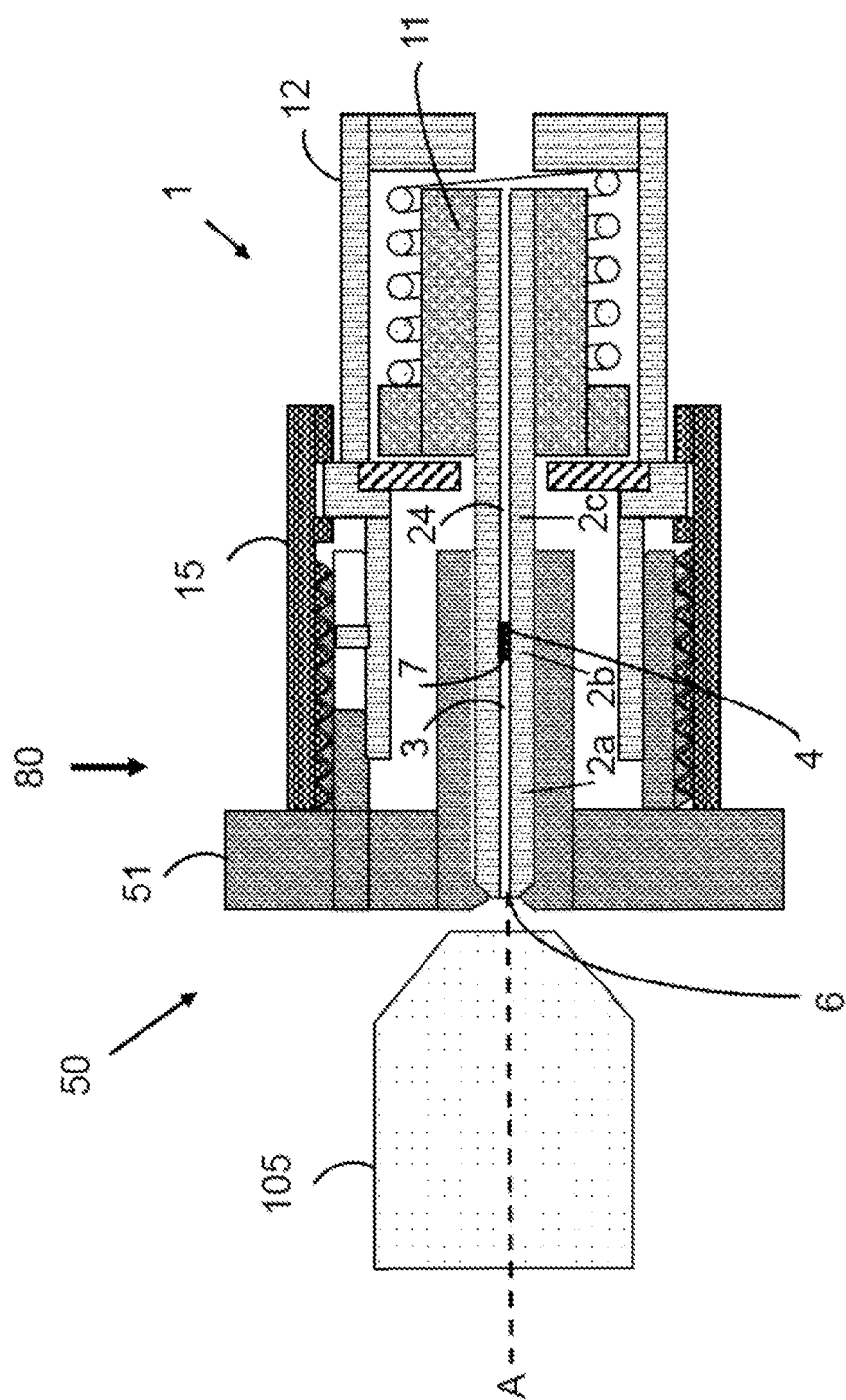
FIG. 5 schematically illustrates a third embodiment of the key holder.

FIG. 5 schematically illustrates a third embodiment of the present invention wherein the position of the optical key 4 differs from the position of the optical key 4 in the first and second embodiment. The differences between the third embodiment and the first and second embodiments will be described below. Apart from these differences, the third embodiment and the first and the second embodiment can be identical. According to the third embodiment, the multimode fiber piece 3 is shorter. Here, as a consequence, the entire multimode fiber 3 is provided outside the ferrule mount 11 and outside the casing 12, the same holds here for the optical key 4. The material of the optical key 4 can, for example, be chosen to be very hard and durable since it is provided in the protruding part of the ferrule 2. It can, for example, be the glass ceramic material as applied according to the second embodiment of the present invention.

Concerning the mounting of the ferrule 2, it is noted that a part of the ferrule 2 provided inside the ferrule mount 11 is also in contact with the ferrule mount 11. The mounting region of the ferrule 2 is therefore bigger than the mounting region of the ferrule 2 in the first and second embodiment. The mounting region of the ferrule 2 can, however, also be designed as in the first and second embodiment, the mounting region thus having the same length as in the first and second embodiment.

As shown in FIG. 5, the ferrule 2 can furthermore be subdivided into three parts 2a, 2b, and 2c. The multimode fiber is provided inside the part 2a. The optical key 4 is provided inside the part 2b. Another material 24 can be provided for filling or stabilizing purposes inside the part 2c. It is not necessary that this part has any specific optical properties. The inside of part 2c can alternatively stay partly or completely empty, as long as the ferrule 2 as such has the necessary stiffness or form stability.

Figure 6:
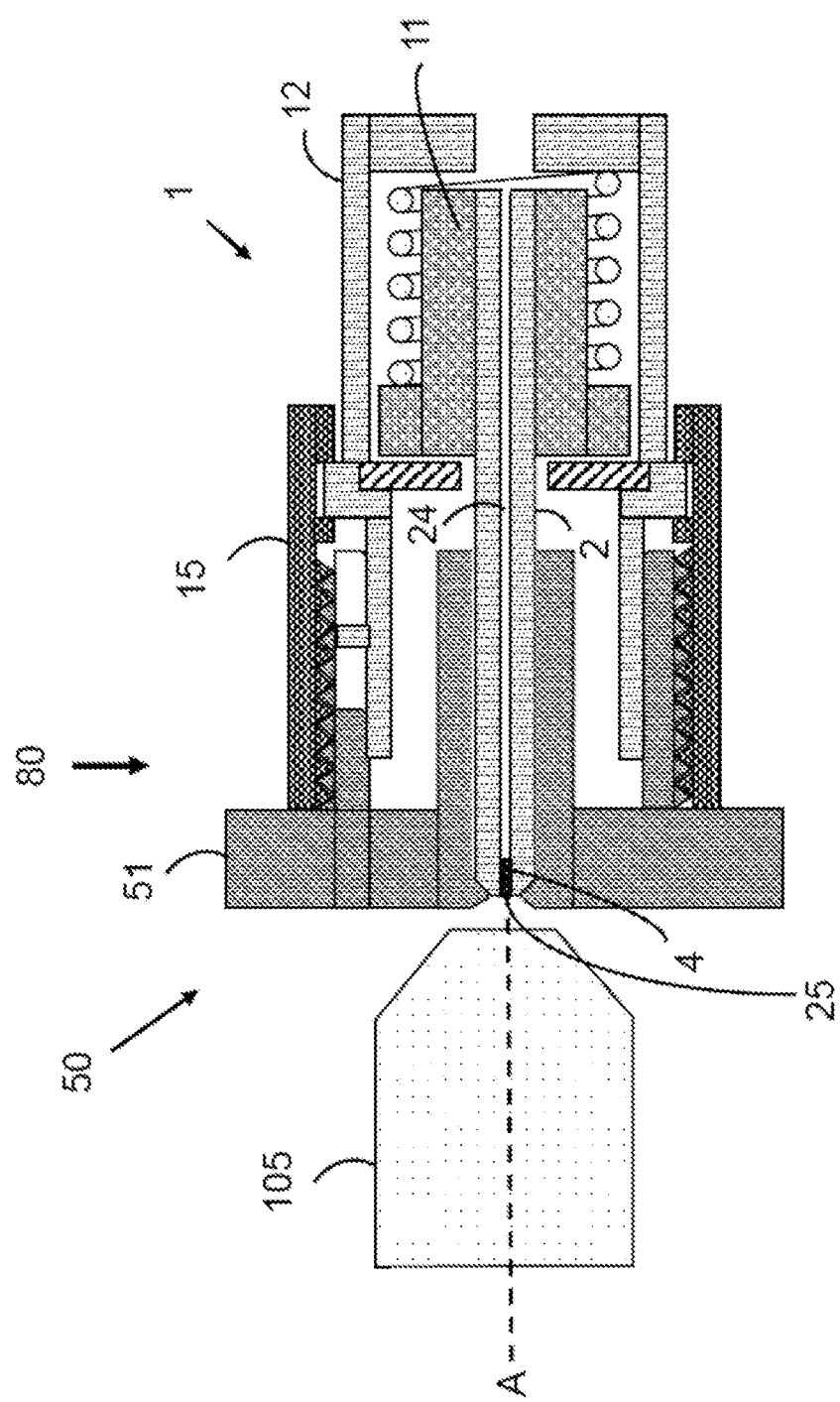
FIG. 6 schematically illustrates a fourth embodiment of the key holder.

FIG. 6 schematically illustrates a fourth embodiment of the present invention wherein the position of the optical key 4 differs from the position of the optical key 4 in the third embodiment. The differences between the fourth embodiment and the third embodiment will be described below. Apart from these differences, the fourth embodiment and the third embodiment can be identical. As shown in FIG. 6, the optical key 4 is provided inside the ferrule 2 at the very beginning of the ferrule 2. The optical key 4 comprises a front facet 25 through which light can enter directly into the optical key 4 without the separate provision of a multimode fiber piece 3. Stated differently, the optical key 4 and the optical multimode fiber piece 3 are provided as one and the same element.

It is once again stressed that the multimode fiber piece 3 is only an example for a multimode light guide 3. In all embodiments depicted in the drawings, the multimode fiber piece can also be changed to another type of multimode light guide. A cross section of the multimode light guide 3 can, for example, be circular, however, other cross-sectional shapes, for example, a rectangular cross-sectional shape, are also possible.

The ferrule 2 is furthermore depicted to have an elongated rotationally symmetric configuration on the inside and on the outside. This is not, however, necessarily the case. It is also possible that the ferrule 2 has a rectangular inner and/or outer cross-sectional shape. An outer cross-sectional shape that is not rotationally symmetric can further contribute to a rotation stop mechanism.

In the depicted embodiments, a part of the casing 12 oriented opposite the mechanical mount terminator 50 comprises an opening 26. This can be provided for ease of manufacturing of the key holder 1, more particularly for inserting the optical key 4 inside the ferrule mount 11. This opening 26 can, however, also be permanently closed afterwards to further protect the optical key 4 from scratches or other damages. The opening 26 does not exist at all in other embodiment variants.

Figure 7:
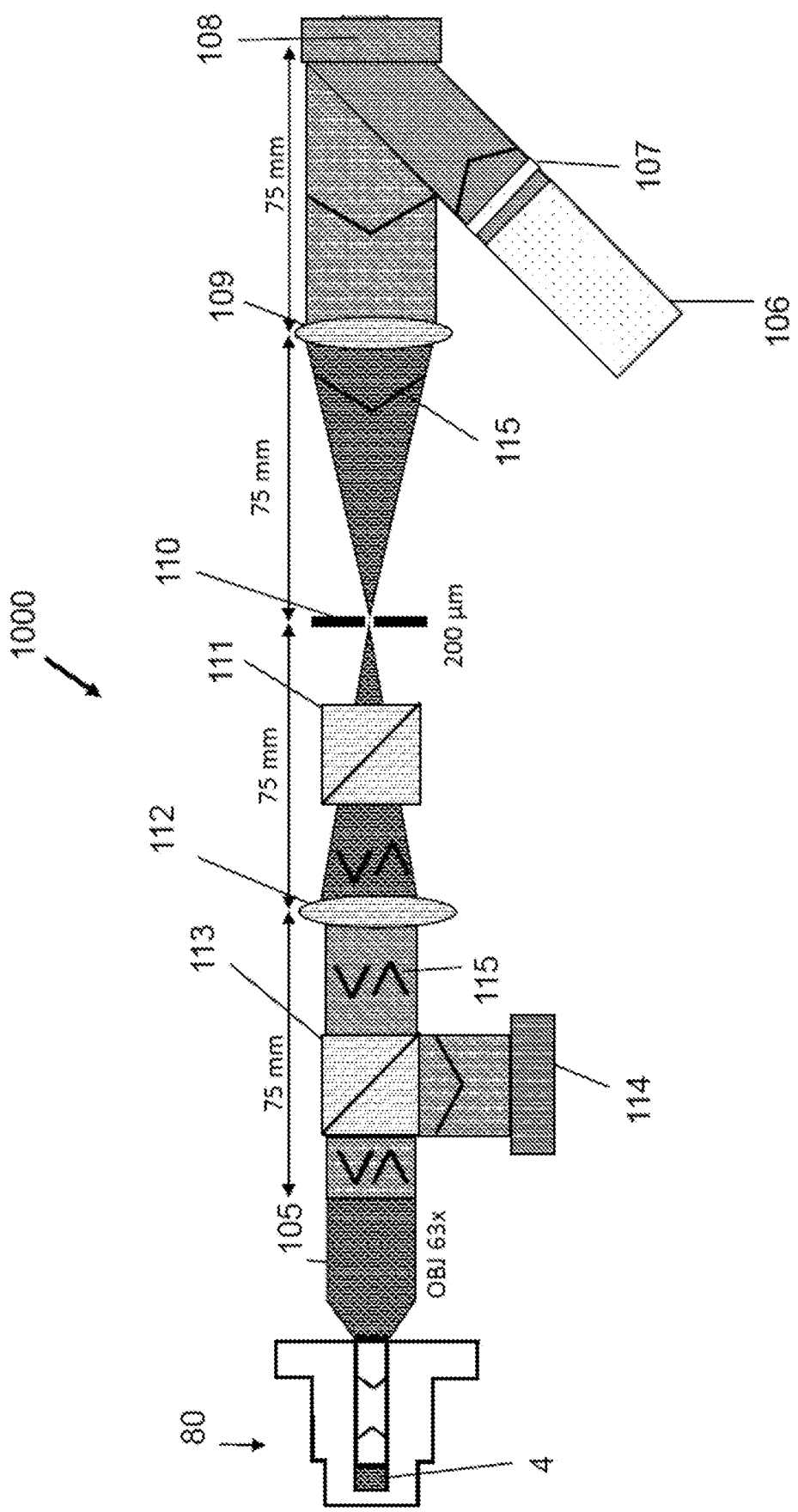
FIG. 7 schematically illustrates a system for authenticating an optical key by verifying a match of a challenge-response pair according to the invention.

FIG. 7 schematically illustrates a system 1000 for authenticating an optical key 4 by verifying a match of a challenge-response pair according to the present invention. The system differs from the system according to the state of the art as depicted in FIG. 1 in that the kinematic base 100 is exchanged against the system 80 comprising the optical key holder 1 with the mechanical mount 5 and the mechanical mount terminator 50 according to the present invention. The system 80 can in particular be realized according to any one of the embodiments of the key holder 1 and the mechanical mount terminator 50 as described above. It is noted that any other system according to the state of the art for authenticating an optical key 4 by verifying a match of a challenge-response pair can also be combined with the new key holder 1 and the new system 80. In each case, the system 1000 for authenticating an optical key 4 by verifying a match of the challenge-response pair comprises a challenge forming device 108 for forming a challenge, an optical key 4 which comprises a scattering material and is receptive to the challenge formed by the challenge forming device 108, and a response verifying device 114 which is receptive to the response provided by the optical key 4 for verifying if the response provided by the optical key 4 matches the challenge formed by the challenge forming device 108.

The embodiments depicted in the drawings are not meant to be limiting to the present invention. The drawings only depict possible realizations of the present invention.

Additional examples for embodiments are described below.

Example 1

Key holder (1) comprising:
a ferrule (2);
an optical key (4) comprising a light scattering material, wherein the optical key (4) is embedded in the ferrule (2) and is provided at a front end of the ferrule (2); and
a mechanical mount (5) mounting the ferrule (2) with the optical key (4),
wherein the optical key (4) comprises a front facet (25) through that light can enter into the optical key (4), and wherein the optical key (4) is adapted so that entered light can then be scattered inside the optical key (4) and can exit the optical key (4) via the front facet (25) of the optical key (4) again, and
wherein the mechanical mount (5) is adapted to be detachably connected to a mechanical mount terminator (50), wherein the front facet (25) of the optical key (4) is oriented in the direction of the mechanical mount terminator (50).

Example 2

Key holder (1) according to Example 1, wherein the following relation holds for an inner diameter df of the ferrule (2): df≥80 μm, in particular df≥100 μm.

Example 3

Key holder (1) according to any one of the preceding Examples, wherein the mechanical mount (5) is adapted to be connected to a mechanical mount terminator (50) by a click mechanism or a screw mechanism.

Example 4

Key holder (1) according to any one of the preceding Examples, wherein the mechanical mount (5) comprises a rotation stop mechanism (8, 9) for enhancing the positional accuracy when connecting the mechanical mount (5) to a mechanical mount terminator (50).

Example 5

Key holder (1) according to the preceding Example, wherein the rotation stop mechanism (8, 9) comprises a guiding ring (9) coaxially provided with the ferrule (2) and outside the ferrule (2), the guiding ring (9) being adapted to be slidably guided inside or outside a corresponding terminator guiding ring (59) provided at a mechanical mount terminator (50), the guiding ring (9) comprising at least one radially protruding pin (8) for securing the mechanical mount (5) against rotation in the mechanical mount terminator (50).

Example 6

Key holder (1) according to any one of the preceding Examples, wherein the mechanical mount (5) comprises a push mechanism (10), for example, a spring mechanism, for pushing the ferrule (2) with the optical key (4) towards a mechanical mount terminator (50) when connecting the mechanical mount (5) to a mechanical mount terminator (50).

Example 7

Key holder (1) according to the previous Example, the mechanical mount further comprising a ferrule mount (11) that is basically provided in the form of a hollow cylinder (11), wherein an end part of the ferrule (2) is provided inside the hollow cylinder (11), the end part of the ferrule (2) being connected to the ferrule mount (11).

Example 8

Key holder (1) according to the preceding Example, wherein the ferrule mount (11) is provided inside a casing (12) of basically cylindrical shape, wherein a spring mechanism (10) coupled to the ferrule mount (11) and wherein the casing (12) is provided inside the casing (12) to push the ferrule mount (11) towards a mechanical mount terminator (50).

Example 9

Key holder (1) according to any one of the preceding Examples,
wherein a spatial positioning accuracy of the front facet (25) of the optical key (4) with respect to a mechanical mount terminator (50) is equal to or better than 1 µm in each of the three spatial directions and/or
wherein an angular positioning accuracy of the front facet (25) of the optical key (4) with respect to a mechanical mount terminator (50) is equal to or better than 1 degree in each of the three angular directions.

Example 10

Key holder (1) according to any one of Examples 1 to 9, wherein the optical key (4) comprises a material mixture of epoxy and scattering particles, in particular a mixture of epoxy and zinc oxide powder.

Example 11

Key holder (1) according to any one of Examples 1 to 9, wherein the optical key (4) is provided as a plug, in particular a plug comprising a ceramic.

Example 12

A mechanical mount terminator (50) adapted to fit to the mechanical mount (5) of a key holder (1) as described in any one of Examples 1 to 11.

Example 13

A system (80) comprising:
the key holder (1) as described in any one of Examples 1 to 11 comprising the mechanical mount (5); and
a mechanical mount terminator (50),
wherein the mechanical mount (5) is detachably mountable or detachably mounted to the mechanical mount terminator (50).

Example 14

The system (80) according to Example 13, wherein the accuracy with which the key holder (1) is detachably mounted to the mechanical mount terminator (50) is equal to or better than $10^{-6}$ m.

Example 15

The system (80) as described in any one of Examples 13 to 14, further comprising an objective (105), wherein the mechanical mount terminator (50) is fixedly arranged with respect to the objective (105).

Example 16

The system (80) as described in any one of Examples 13 to 15, wherein the mechanical mount terminator (50) comprises a base plate (51) having a through hole (52) facing the front face (6) of the optical key (4) when the mechanical mount (5) is mounted to the mechanical mount terminator (5).

Example 17

The system (80) as described in Example 16, wherein the base plate (51) further comprises a ring-shaped reception part (53) coaxially arranged with the optical axis (A) of the system (80), the reception part (53) being adapted for receiving at least part of the ferrule (2).

Example 18

The system (80) as described in Example 17, wherein the base plate (51) further comprises a ring-shaped fixation part (59) being coaxially arranged with respect to the ring-shaped reception part (53) and being arranged radially outside and in particular with a radial distance to the reception part (53), the ring-shaped fixation part (59) comprising a bore hole (58) for receiving a pin (8) of the mechanical mount (5) in order to secure the mechanical mount (5) and the mechanical mount terminator (50) against relative rotation.

Example 19

A system (1000) for authenticating an optical key by verifying a match of a challenge-response pair, comprising:
a challenge forming device (108) for forming a challenge;
an optical key (4) which comprises a scattering material and is receptive to the challenge formed by the challenge forming device (108); and a response verifying device (114) which is receptive to the response provided by the optical key for verifying if the response provided by the optical key (4) matches the challenge formed by the challenge forming device (108), characterized by the system (80) as described in any one of Examples 13 to 18, wherein the optical key (4) is held by the key holder (1).

Example 20

System according to Example 19, wherein the following relation holds:

$$q=\text{Int}_{exit}/\text{Int}_{enter} \geq 50\%, \text{ in particular } q \geq 70\%,$$

wherein $\text{Int}_{enter}$ is the intensity of light entering the optical key (4) via its front facet (25) and $\text{Int}_{exit}$ is the intensity of light exiting the optical key (4) via its front facet (25) after having been scattered by the light scattering material of the optical key (4).

The present invention is not limited to embodiments described herein; reference should be had to the appended claims.

LIST OF REFERENCE SIGNS 1 key holder
2 ferrule
2a-c parts of ferrule
3 multimode fiber piece
4 optical key
5 mechanical mount
6 front facet
7 back facet
8 pin, rotation stop mechanism
9 guiding ring, rotation stop mechanism
10 spring, push mechanism
11 ferrule mount, hollow cylinder
12 casing, cylindrical shape
13 contact area for spring
14 contact area for spring
15 coupling nut
16 thread
17 ring
18 recess
19 recess
20 opening
21 outer face of ferrule
22 tapered part
23 outer face of guiding ring
24 material or space inside part 2c of the ferrule
25 front facet of the optical key
26 opening
50 mechanical mount terminator
51 base plate
52 through hole in the base plate
53 ring-shaped reception part
58 bore hole for receiving a pin
59 ring-shaped fixation part, terminator guiding ring
60 thread
61 inner face of the terminator guiding ring
62 outer face of the terminator guiding ring
63 inner face of the terminator guiding ring
64 contact area
80 system
100 kinematic base
101 top plate (key holder)
102 bottom plate
103 optical key
104 structure for positioning
105 objective
106 laser
107 half-wave plate
108 DMD (digital micromirror device)
109 lens
110 aperture
111 beam splitter
112 lens
113 partial beam splitter
114 camera, CCD
115 direction of propagating light
1000 QSA demonstrator set-up
A optical axis

What is claimed is:

1. A key holder comprising:
a ferrule;
a multimode light guide at least partly embedded inside the ferrule, the multimode light guide comprising a front facet and a back facet which are arranged at opposite ends of the multimode light guide;
an optical key which comprises a light scattering material; and
a mechanical mount which is configured to mount each of the ferrule, the multimode light guide, and the optical key,
wherein,
the back facet of the multimode light guide contacts the optical key,
the multimode light guide is configured so that light can enter into the multimode light guide via the front facet, propagate through the multimode light guide, be scattered by the optical key, and propagate back through the multimode light guide and exit via the front facet,
the mechanical mount is further configured to be detachably connected to a mechanical mount terminator, and
the front facet of the multimode light guide is oriented in a direction of the mechanical mount terminator.

2. The key holder as recited in claim 1, wherein,
the multimode light guide is further configured so that light which can enter into the multimode light guide via the front facet propagates through the multimode light guide via a total internal reflection, and
the multimode light guide is a multimode fiber piece which has a numerical aperture NA with a relation of NA≥0.50.

3. The key holder as recited in claim 1, wherein,
the multimode light guide further comprises a core having a diameter d, and
the diameter of the core is ≥80 μm.

4. The key holder as recited in claim 1, wherein the mechanical mount is further configured to be connected to the mechanical mount terminator via a click mechanism or a screw mechanism.

5. The key holder as recited in claim 1, wherein the mechanical mount comprises a rotation stop mechanism which is configured to enhance a positional accuracy when connecting the mechanical mount to the mechanical mount terminator.

6. The key holder as recited in claim 5, wherein,
the mechanical mount terminator comprises a terminator guiding ring,
the rotation stop mechanism comprises a guiding ring which is arranged coaxially with the ferrule and outside the ferrule, the guiding ring being configured to be slidably guided inside or outside the terminator guiding ring, and the guiding ring comprises at least one radially protruding pin for securing the mechanical mount against a rotation in the mechanical mount terminator.

7. The key holder as recited in claim 1, wherein, the mechanical mount comprises a push mechanism which is configured to push the multimode light guide towards the mechanical mount terminator when connecting the mechanical mount to the mechanical mount terminator, and the push mechanism is a spring mechanism.

8. The key holder as recited in claim 7, wherein, the mechanical mount further comprises a ferrule mount which comprises a hollow cylinder, the ferrule comprises an end part which is arranged inside of the hollow cylinder, at least a part of the optical key is arranged inside the hollow cylinder, and the end part of the ferrule and the part of the optical key are each connected to the ferrule mount.

9. The key holder as recited in claim 8, further comprising:

a casing having a substantially cylindrical shape; and a spring mechanism, wherein, the ferrule mount is provided inside the casing, and the spring mechanism is coupled to the ferrule mount and is arranged inside the casing, the spring mechanism being configured to push the ferrule mount towards the mechanical mount terminator.

10. The key holder as recited in claim 1, wherein the optical key is completely arranged inside the ferrule.

11. The key holder as recited in claim 1, wherein at least one of, a spatial positioning accuracy of the front facet of the multimode light guide with respect to the mechanical mount terminator is equal to or better than 1μm in each of three spatial directions, and an angular positioning accuracy of the front facet of the multimode light guide with respect to the mechanical mount terminator is equal to or better than 1 degree in each of the three angular directions.

12. The key holder as recited in claim 1, wherein, the optical key comprises, as the light scattering material, a material mixture of epoxy and scattering particles, or the optical key is provided as a plug.

13. The key holder as recited in claim 1, wherein the multimode optical light guide is a multimode fiber piece.

14. A mechanical mount terminator which is configured to fit to the mechanical mount of the key holder as recited in claim 1.

15. A system comprising:

the key holder as recited in claim 1; and a mechanical mount terminator, wherein, the mechanical mount of the key holder is configured to be detachably mountable or detachably mounted to the mechanical mount terminator.

16. The system as recited in claim 15, wherein an accuracy with which the key holder is detachably mountable to the mechanical mount terminator is equal to or better than $10^{-6}$ m.

17. The system as recited in claim 15, further comprising:

an objective, wherein, the mechanical mount terminator is fixedly arranged with respect to the objective.

18. The system as recited in claim 15, wherein the mechanical mount terminator comprises a base plate having a through hole which faces the front face of the multimode light guide when the mechanical mount is mounted to the mechanical mount terminator.

19. The system as recited in claim 18, wherein, the base plate further comprises a ring-shaped reception part which is arranged coaxially with an optical axis of the system, and the ring-shaped reception part is configured to receive at least a part of the ferrule.

20. The system as recited in claim 19, wherein, the mechanical mount of the key holder comprises a pin, the base plate further comprises a ring-shaped fixation part which is arranged coaxially with respect to the ring-shaped reception part and which is arranged radially outside and with a radial distance to the ring-shaped reception part, and the ring-shaped fixation part comprises a bore hole for receiving the pin of the mechanical mount in order to secure the mechanical mount and the mechanical mount terminator against a relative rotation.

21. A system for authenticating an optical key by verifying a match of a challenge-response pair, the system comprising:

a challenge forming device which is configured to form a challenge;

an optical key which comprises a scattering material, the optical key being receptive to the challenge formed by the challenge forming device by providing a response; and a response verifying device which is receptive to the response provided by the optical key for verifying if the response provided by the optical key matches the challenge formed by the challenge forming device, wherein, the optical key is provided by the system as recited in claim 15, and the optical key is held by the key holder of the system as recited in claim 15.

22. The system according to claim 21, wherein the following relation holds:

$q = \text{Int}_{exit}/\text{Int}_{enter} \geq 50\%$, wherein, $\text{Int}_{enter}$ is an intensity of light entering the multimode light guide via the front facet, and $\text{Int}_{exit}$ is an intensity of light exiting the multimode light guide via the front facet after having been scattered by the light scattering material of the optical key.

* * * * *